United States Patent
Yamazaki et al.

(10) Patent No.: US 12,203,907 B2
(45) Date of Patent: Jan. 21, 2025

(54) AUTOSAMPLER FOR LIQUID CHROMATOGRAPH

(71) Applicant: SHIMADZU CORPORATION, Kyoto (JP)

(72) Inventors: Tomoyuki Yamazaki, Kyoto (JP); Tatsuya Obe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 432 days.

(21) Appl. No.: 17/738,116

(22) Filed: May 6, 2022

(65) Prior Publication Data

US 2022/0404320 A1 Dec. 22, 2022

(30) Foreign Application Priority Data

Jun. 17, 2021 (JP) .................................. 2021-100676

(51) Int. Cl.
*G01N 30/32* (2006.01)
*G01N 1/14* (2006.01)
(Continued)

(52) U.S. Cl.
CPC ............... *G01N 30/32* (2013.01); *G01N 1/14* (2013.01); *G01N 30/24* (2013.01); *G01N 35/1004* (2013.01); *G01N 2035/00277* (2013.01)

(58) Field of Classification Search
CPC .......... G01N 30/32; G01N 1/14; G01N 30/24; G01N 35/1004; G01N 2035/00277; G01N 30/16
See application file for complete search history.

(56) References Cited

U.S. PATENT DOCUMENTS

2020/0200717 A1 6/2020 Minato et al.

FOREIGN PATENT DOCUMENTS

| JP | H09184846 A | * | 7/1997 |
| JP | 2006162260 A | | 6/2006 |

(Continued)

OTHER PUBLICATIONS

Office Action for corresponding Chinese Patent Application No. 202210275345.2 issued Apr. 18, 2024, with English machine translation.

(Continued)

*Primary Examiner* — Waqaas Ali
(74) *Attorney, Agent, or Firm* — Renner, Otto, Boisselle & Sklar, LLP

(57) ABSTRACT

A sampling needle (2) having a suction port at a tip, a movement mechanism (4) that moves the needle (2) at least in a vertical direction while holding the needle (2) in a state where the suction port faces vertically downward, a suction mechanism (6) for sucking liquid through the needle (2), a controller (10) configured to control operation of the movement mechanism (4) and the suction mechanism (6) are included. In sampling of liquid from a container (16) whose upper surface is opened, the controller (10) is configured to execute an inserting step of inserting the tip of the needle (2) into the liquid in the container (16) by lowering the needle (2) from above the container (16), a sucking step of sucking a predetermined amount of the liquid from the suction port of the needle (2) after the inserting step is completed, a pulling up step of pulling up the needle (2) from the liquid to position the suction port above a liquid level of the liquid after the sucking step is completed, and a shaking-off step of repeating shaking-off operation of lowering and suddenly stopping the needle (2) a plurality of times with standby time in which the needle (2) is completely stopped or raised in between while maintaining a state where the suction port is positioned above the liquid level after the pulling up step is completed.

5 Claims, 2 Drawing Sheets

(51) Int. Cl.
    *G01N 30/24*    (2006.01)
    *G01N 35/10*    (2006.01)
    *G01N 35/00*    (2006.01)

(56) References Cited

FOREIGN PATENT DOCUMENTS

| | | |
|---|---|---|
| JP | 4296814 B2 | 7/2009 |
| JP | 2021042985 A | 3/2021 |
| WO | 2019043907 A1 | 3/2019 |

OTHER PUBLICATIONS

Office Action for corresponding Chinese Patent Application No. 202210275345.2 issued Jun. 28, 2024, with English machine translation.

Office Action for corresponding Japanese Patent Application No. 2021-100676 issued Jul. 30, 2024, with English machine translation.

Office Action for corresponding Chinese Patent Application No. 202210275345.2 dated Aug. 30, 2023, with English machine translation.

Rejection Decision for corresponding Chinese Patent Application No. 202210275345.2 issued Aug. 19, 2024, with English machine translation.

\* cited by examiner

AUTOSAMPLER FOR LIQUID CHROMATOGRAPH

BACKGROUND OF THE INVENTION

1. Field of the Invention

The present invention relates to an autosampler for a liquid chromatograph.

2. Description of the Related Art

A liquid chromatograph includes an autosampler that injects a sample into a mobile phase fed by a liquid delivery pump. The autosampler moves a needle in the horizontal direction and the vertical direction, inserts the tip of the needle into a sample in a target container, and sucks a predetermined amount of the sample from the tip of the needle. When the suction of the sample from the container is completed, the autosampler pulls up the needle to above the container, then moves the needle to an injection port, and injects the sucked sample into a mobile phase (see WO 2019/043907 A).

SUMMARY OF THE INVENTION

Among autosamplers, there is one (also referred to as a liquid handler) that also has a function as a fraction collector that fractionates and collects an eluate containing each component separated by an analysis column by dropping the eluate from a nozzle to an individual collection container. In such an autosampler, the eluate collected in the collection container may be sucked with a needle as a sample and reinjected into a mobile phase. At this time, since an upper surface of the collection container is open, when the needle is pulled up from the collection container, there is nothing that wipes the sample attached to an outer surface of the needle, and the sample tends to remain on the outer surface of the needle. When the needle with the sample attached to the outer surface moves to another location, the sample drops during the movement of the needle, which causes contamination in a device.

Japanese Patent No. 4296814 describes that in order to separate liquid attached to an outer peripheral surface of a needle-shaped member from the needle-shaped member, the needle-shaped member is moved in a specific direction to collide with a stopper, so that acceleration in a direction opposite to the moving direction of the needle is applied to the needle-shaped member to shake off a droplet from the needle-shaped member. When this technique is applied to an autosampler, it is possible to shake off a droplet attached to a tip portion of a needle. However, it has been found that in a case where a needle is inserted deep into liquid for suction, the liquid adheres not only to a tip portion but also to a portion above the tip portion on an outer surface of the needle, and even if acceleration due to collision is applied to the needle as in Japanese Patent No. 4296814, a part of the liquid may remain on the outer surface of the needle.

The present invention has been made in view of the above problem, and an object of the present invention is to provide an autosampler capable of preventing occurrence of contamination due to liquid attached to an outer surface of a needle even after the needle is inserted deep into the liquid.

An autosampler for a liquid chromatograph according to the present invention includes a sampling needle having a suction port at a tip, a movement mechanism that moves the needle at least in a vertical direction while holding the needle in a state where the suction port faces vertically downward, a suction mechanism for sucking liquid through the needle, and a controller configured to control operation of the movement mechanism and the suction mechanism. In sampling of liquid from a container whose upper surface is opened, the controller is configured to execute an inserting step of inserting the tip of the needle into the liquid in the container by lowering the needle from above the container, a sucking step of sucking a predetermined amount of the liquid from the suction port of the needle after the inserting step is completed, a pulling up step of pulling up the needle from the liquid to position the suction port above a liquid level of the liquid after the sucking step is completed, and a shaking-off step of repeating shaking-off operation of lowering and suddenly stopping the needle a plurality of times while maintaining a state where the suction port is positioned above the liquid level after the pulling up step is completed.

According to the autosampler for a liquid chromatograph according to the present invention, after the needle is pulled up from liquid, shaking-off operation of lowering the needle and suddenly stopping the needle is repeated a plurality of times while a state in which the suction port of the needle is positioned above the liquid level is maintained. Therefore, liquid that is not shaken off by one time of the shaking-off operation can be effectively shaken off from an outer surface of the needle.

DETAILED DESCRIPTION OF THE INVENTION

Figure 1:
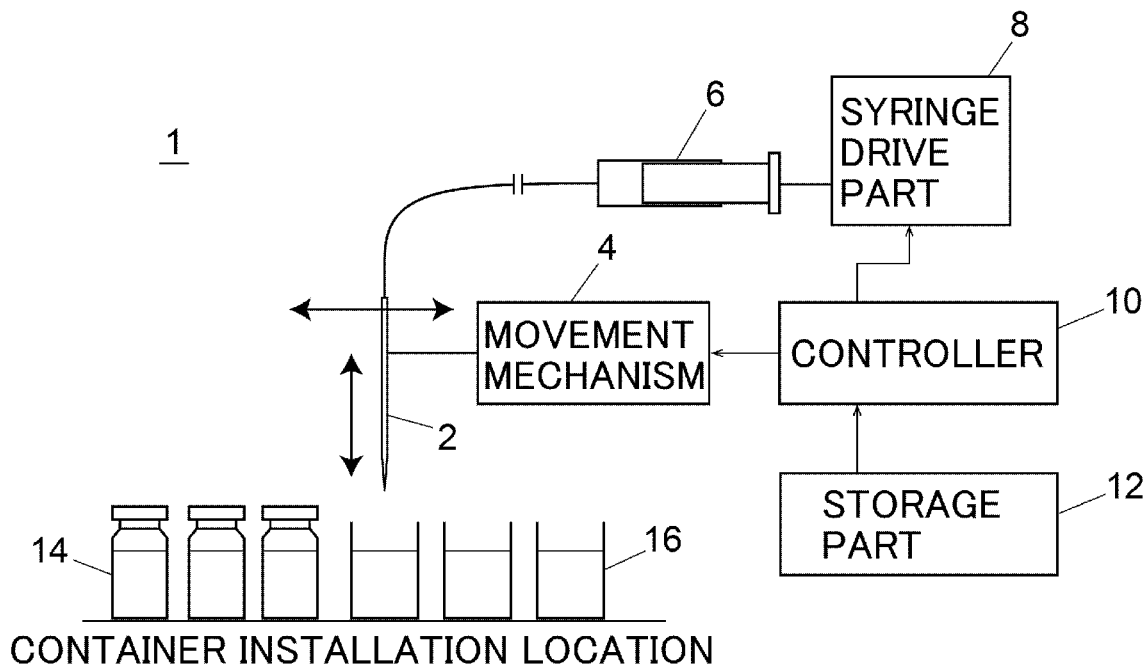
FIG. 1 is a schematic configuration diagram illustrating an embodiment of an autosampler.

Hereinafter, an embodiment of an autosampler for a liquid chromatograph according to the present invention will be described with reference to the drawings.

An autosampler 1 includes a needle 2, a movement mechanism 4, a syringe pump 6, a syringe drive part 8, a controller 10, and a storage part 12.

The needle 2 is a sampling needle having a suction port at the tip. The movement mechanism 4 is a mechanism configured to hold the needle 2 such that the suction port at the tip faces vertically downward and move the needle 2 in the horizontal direction and the vertical direction. The syringe pump 6 as a suction mechanism is in fluid communication with the proximal end of the needle 2, and sucks and discharges fluid through the needle 2. The syringe drive part 8 includes a mechanism such as a stepping motor for driving the syringe pump 6.

The controller 10 controls the movement of the needle 2 and suction/discharge operation of fluid by the syringe pump 6 via the needle 2 by controlling the movement mechanism 4 and the syringe drive part 8. The controller 10 is a function realized as software is executed in a computer circuit including a central processing part (CPU) and the like. The storage part 12 stores settings related to operation control of the needle 2 and the syringe pump 6 by the controller 10. The controller 10 controls operation of the needle 2 and the syringe pump 6 based on the setting stored in the storage part 12. The storage part 12 is a function realized by a partial storage area of an information storage device such as a hard disk drive or a flash memory.

The autosampler 1 is provided with a container installation location where containers 14 and 16 for containing liquid such as a sample are installed. In the container installation location, the container 14 (hereinafter, the sealed container 14) whose upper surface is sealed with a septum and the container 16 (hereinafter, the open container 16) whose upper surface is open are installed. Examples of the sealed container 14 include a reagent container containing a reagent, a sample container containing a sample, and the like. Examples of the open container 16 include a collection container that collects an eluate from an analysis column. That is, the autosampler 1 of the present embodiment may have a function as a fraction collector that fractionates and collects an eluate from the analysis column.

The controller 10 is configured to execute sampling from the sealed container 14 or the open container 16 installed in the container installation location by controlling the movement mechanism 4 and the syringe drive part 8 based on a preset analysis program. Furthermore, the controller 10 is configured to vary operation of the needle 2 depending on whether a target container is the sealed container 14 or the open container 16 at the time of sampling.

Figure 2:
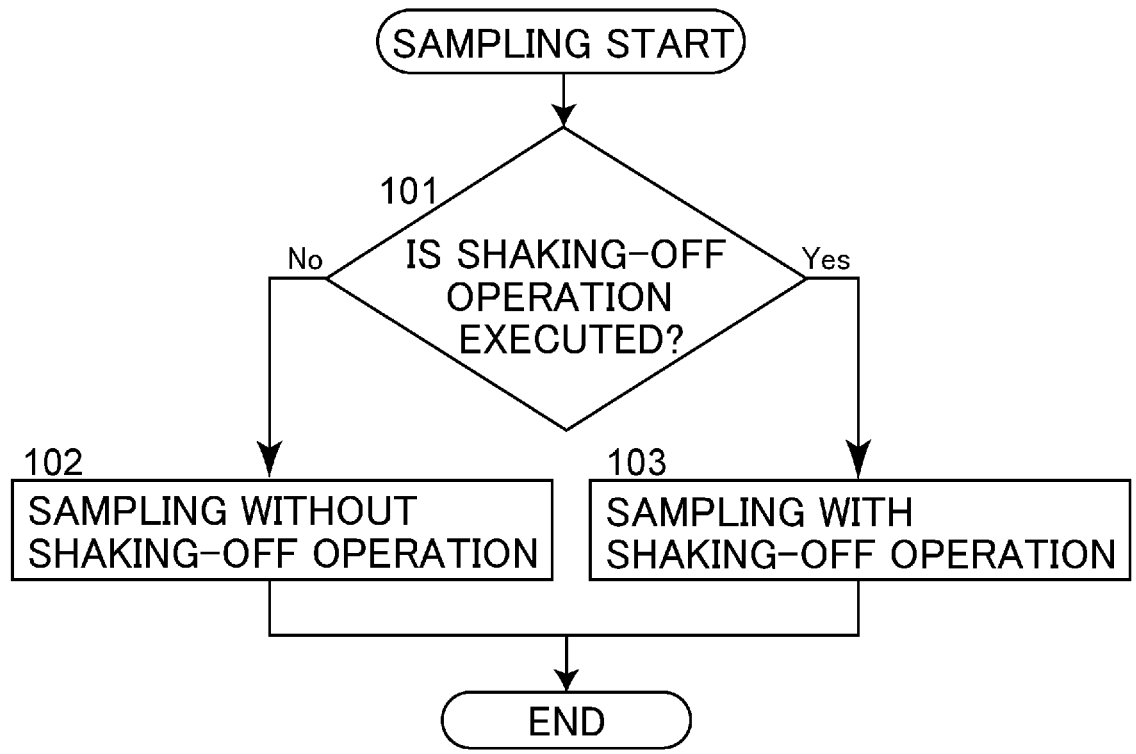
FIG. 2 is a flowchart illustrating an example of sampling in the embodiment.

FIG. 2 is a flowchart illustrating an example of operation at the time of sampling.

As a premise, whether or not to execute shaking-off operation at the time of sampling is set for each container by the user, and the setting is stored in the storage part 12. Normally, the user checks whether a target container is the sealed container 14 or the open container 16. In a case where the target container is the sealed container 14, the shaking-off operation is set not to be executed, and in a case where the target container is the open container 16, the shaking-off operation is set to be executed.

When a timing to perform liquid sampling is reached, the controller 10 checks whether or not the shaking-off operation set for a target container is executed (Step 101). In a case where the shaking-off operation is set not to be executed for the target container (Step 101: No), the controller 10 executes sampling without the shaking-off operation for shaking off liquid attached to the needle 2 (Step 102). In a case where the shaking-off operation is set to be executed for the target container (Step 101: Yes), the controller executes sampling with the shaking-off operation for shaking off liquid attached to the needle 2 (Step 103).

The sampling without the shaking-off operation is operation as described below. First, the needle 2 is lowered vertically downward from above the target sealed container 14 to allow the needle 2 to penetrate a septum sealing an upper surface of the sealed container 14, and the tip of the needle 2 is inserted into liquid in the sealed container 14 so that the liquid is sucked from the tip of the needle 2. After the above, the needle 2 is raised to a predetermined height at a speed lower than a speed at which the needle 2 is lowered, and completely pulled out of the sealed container 14, and the needle 2 is moved to a next location, for example, an injection port for injecting a sample into a mobile phase. When the needle 2 is pulled out from the sealed container 14, liquid attached to an outer surface of the needle 2 is wiped by the septum.

In contrast, in a case where a container as a target of sampling is the open container 16, since there is no septum for wiping liquid attached to an outer surface of the needle 2 after liquid is sucked, sampling with the shaking-off operation for shaking off the liquid attached to the outer surface of the needle 2 into the same open container 16 is set to be executed.

Note that, in the above description, the user sets whether or not to execute the shaking-off operation. However, the present invention is not limited to this, and the controller 10 may check whether the target container is the sealed container 14 or the open container 16 before executing sampling, and automatically determine whether or not to execute the shaking-off operation.

Figure 3:
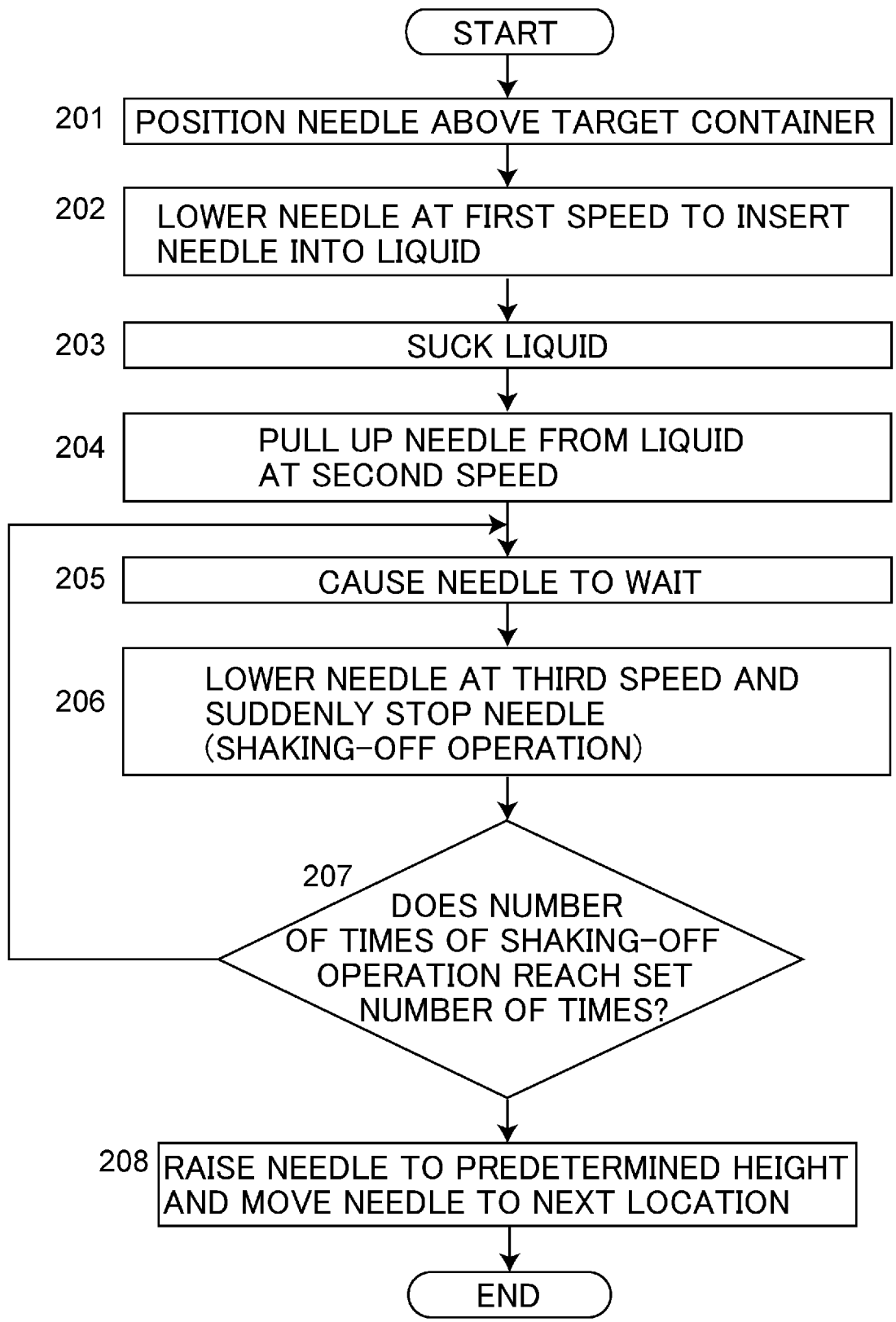
FIG. 3 is a flowchart illustrating an example of sampling with shaking-off operation according to the embodiment.

Sampling with the shaking-off operation will be described with reference to FIG. 1 and a flowchart of FIG. 3.

In the sampling with the shaking-off operation, the controller 10 positions the needle 2 above the target open container 16 (Step 201), lowers the needle 2 vertically downward at a first speed, inserts the tip of the needle 2 into liquid, and sucks a predetermined amount of the liquid (Steps 202 and 203). After the above, the needle 2 is pulled up at a second speed so that the suction port of the needle 2 is located above a liquid level (204). The moving speed (second speed) of the needle 2 when the needle 2 is pulled up from the liquid is a speed set to reduce liquid attached to the outer surface of the needle 2, and is lower than the moving speed (first speed) of the needle 2 when the needle 2 is inserted into the liquid.

After the needle 2 is pulled up from the liquid, the needle 2 is caused to wait at that position for predetermined time (Step 205). This waiting time is time for moving the liquid attached to the outer surface of the needle 2 to the tip side of the needle 2 by gravity. After the above, the shaking-off operation of lowering the needle 2 at a third speed higher than the first speed and then suddenly stopping the needle 2 is executed (Step 206). By the shaking-off operation, the liquid attached to a tip portion of the needle 2 is shaken off the needle 2 and falls into the open container 16 immediately below.

The storage part 12 stores the number of times (two or more times) of the shaking-off operation to be executed. The controller 10 executes the shaking-off operation the number of times stored in the storage part 12 with standby time in between (Steps 205 to 207). The number of times of the shaking-off operation may be a specified value. However, the configuration may be such that the user can set the number of times of the shaking-off operation in consideration of the viscosity of liquid to be sucked.

Here, the shaking-off operation needs to be executed while a state in which the suction port of the needle 2 is positioned above a liquid level in the container 16 is maintained. In an example of FIG. 3, the step of raising the needle 2 is not included during the shaking-off operation executed a plurality of times. However, the step of raising the needle 2 may be performed between during the shaking-off operation executed a plurality of times if necessary for maintaining the state where the suction port of the needle 2 is positioned above the liquid level in the container 16, or the needle 2 may be raised during the standby time.

When the shaking-off operation of the preset number of times is completed, the controller 10 raises the needle 2 to a predetermined height at which the tip of the needle 2 does not interfere with the container 14 or 16 even if the needle 2 is moved horizontally, and moves the needle 2 to a next location such as an injection port (Step 208).

Note that other operation such as air suction can be executed during the standby time.

The embodiment described above is merely an example of an embodiment of the autosampler according to the present invention. The embodiment of the autosampler according to the present invention is as described below.

An embodiment of an autosampler according to the present invention includes a sampling needle having a suction port at a tip, a movement mechanism that moves the needle at least in a vertical direction while holding the needle in a state where the suction port faces vertically downward, a suction mechanism for sucking liquid through the needle, and a controller configured to control operation of the movement mechanism and the suction mechanism. In sampling of liquid from a container whose upper surface is opened, the controller is configured to execute an inserting step of inserting the tip of the needle into the liquid in the container by lowering the needle from above the container, a sucking step of sucking a predetermined amount of the liquid from the suction port of the needle after the inserting step is completed, a pulling up step of pulling up the needle from the liquid to position the suction port above a liquid level of the liquid after the sucking step is completed, and a shaking-off step of repeating shaking-off operation of lowering and suddenly stopping the needle a plurality of times while maintaining a state where the suction port is positioned above the liquid level after the pulling up step is completed.

In a first aspect of the embodiment, the controller is configured to control the movement mechanism so that a moving speed of the needle while lowering in the shaking-off step is higher than that of the needle while lowering in the inserting step. According to such an aspect, as compared with a case where the shaking-off operation is executed at a normal speed which is the speed when the needle is inserted into liquid, a force of shaking off liquid downward is large, and thus the liquid is less likely to remain on an outer surface of the needle.

In a second aspect of the embodiment, the controller is configured to control the movement mechanism so that a moving speed of the needle while raising in the pulling up step is lower than that of the needle while lowering in the inserting step. According to such an aspect, liquid is less likely to remain on the outer surface of the needle when the needle is pulled up from liquid. This second aspect can be combined with the first aspect.

In a third aspect of the embodiment, the controller is configured to provide standby time between each the shaking-off operation when repeating the shaking-off operation in the shaking-off step. According to such an aspect, liquid attached closer to the upper side than the tip of the needle gathers at the tip of the needle during the standby time, and the liquid that has gathered at the tip of the needle is shaken off the needle by the shaking-off operation executed subsequently. Therefore, contamination due to the liquid attached to the outer surface of the needle is less likely to occur even after the needle is inserted deeply into liquid.

In the third aspect, the controller may be configured to raise the needle during the standby time.

In a fourth aspect of the embodiment, a storage part that stores a number of times of the shaking-off operation set by the user is further included. The controller is configured to execute the shaking-off operation the number of times stored in the storage part in the shaking-off step. According to such an aspect, the user can increase or decrease the number of times of the shaking-off operation in consideration of viscosity or the like of a suction target. This third aspect can be freely combined with any of the first to third aspects.

DESCRIPTION OF REFERENCE SIGNS 1 autosampler
2 needle
4 movement mechanism
6 syringe pump
8 syringe drive part
10 controller
12 storage part
14 sealed container
16 open container

What is claimed is:

1. An autosampler for a liquid chromatograph, the autosampler comprising:
   a sampling needle having a suction port at a tip;
   a movement mechanism that moves the needle at least in a vertical direction while holding the needle in a state where the suction port faces vertically downward;
   a suction mechanism for sucking liquid through the needle; and
   a controller configured to control operation of the movement mechanism and the suction mechanism, wherein
   in sampling of liquid from a container whose upper surface is opened, the controller is configured to execute:
      an inserting step of inserting the tip of the needle into the liquid in the container by lowering the needle from above the container;
      a sucking step of sucking a predetermined amount of the liquid from the suction port of the needle after the inserting step is completed;
      a pulling up step of pulling up the needle from the liquid to position the suction port above a liquid level of the liquid after the sucking step is completed; and
      a shaking-off step of repeating shaking-off operation of lowering and suddenly stopping the needle a plurality of times while maintaining a state where the suction port is positioned above the liquid level after the pulling up step is completed;
   wherein the control is configured to control the movement mechanism so that a moving speed of the needle while raising in the pulling up step is lower than that of the needle while lowering in the inserting step.

2. The autosampler according to claim 1, wherein the controller is configured to control the movement mechanism so that a moving speed of the needle while lowering in the shaking-off step is higher than that of the needle while lowering in the inserting step.

3. The autosampler according to claim 1, wherein the controller is configured to provide standby time between each the shaking-off operation when repeating the shaking-off operation in the shaking-off step.

4. The autosampler according to claim 3, wherein the controller is configured to raise the needle during the standby time.

5. An autosampler for a liquid chromatograph, the autosampler comprising:
   a sampling needle having a suction port at a tip;
   a movement mechanism that moves the needle at least in a vertical direction while holding the needle in a state where the suction port faces vertically downward;
   a suction mechanism for sucking liquid through the needle; and
   a controller configured to control operation of the movement mechanism and the suction mechanism, wherein
   in sampling of liquid from a container whose upper surface is opened, the controller is configured to execute:
      an inserting step of inserting the tip of the needle into the liquid in the container by lowering the needle from above the container;

a sucking step of sucking a predetermined amount of the liquid from the suction port of the needle after the inserting step is completed;

a pulling up step of pulling up the needle from the liquid to position the suction port above a liquid level of the liquid after the sucking step is completed; and a shaking-off step of repeating shaking-off operation of lowering and suddenly stopping the needle a plurality of times while maintaining a state where the suction port is positioned above the liquid level after the pulling up step is completed, wherein a storage part that stores a number of times of the shaking-off operation set by a user, wherein the controller is configured to execute the shaking-off operation the number of times stored in the storage part in the shaking-off step.

* * * * *